United States Patent [19]

Garcia, Jr. et al.

[11] Patent Number: 5,513,368
[45] Date of Patent: Apr. 30, 1996

[54] COMPUTER I/O ADAPTERS FOR PROGRAMMABLY VARYING STATES OF PERIPHERAL DEVICES WITHOUT INTERFERING WITH CENTRAL PROCESSOR OPERATIONS

[75] Inventors: Serafin J. E. Garcia, Jr., Lake Worth; Gary B. Hoch, Coral Springs; Eric H. Stelzer, Boca Raton; Donald G. Williams, Delray Beach, all of Fla.

[73] Assignee: International Business Machines Corporation, Armonk, N.Y.

[21] Appl. No.: 93,541

[22] Filed: Jul. 16, 1993

[51] Int. Cl.⁶ .............................. G06F 9/30; G06F 15/16
[52] U.S. Cl. ..................... 395/842; 395/843; 395/844; 364/242.3; 364/228.5; 364/238.3
[58] Field of Search .................. 395/200.01, 841, 395/842, 843, 844; 364/228.5, 242.3, 238.3

[56] References Cited

U.S. PATENT DOCUMENTS

| | | | |
|---|---|---|---|
| 4,460,971 | 7/1984 | Numata et al. | 364/900 |
| 4,783,730 | 11/1988 | Fischer | 364/200 |
| 4,901,232 | 2/1990 | Harrington et al. | 364/200 |
| 5,103,446 | 4/1992 | Fischer | 370/85.1 |
| 5,179,660 | 1/1993 | Devany et al. | 395/200 |
| 5,337,410 | 8/1994 | Appel | 395/162 |
| 5,438,665 | 8/1995 | Taniai et al. | 395/845 |

Primary Examiner—Thomas C. Lee
Assistant Examiner—Rehana Perveen Krick
Attorney, Agent, or Firm—Romualdas Strimaitis; Robert Lieber

[57] ABSTRACT

DMA adapters which perform programmed data transfer operations in response to descriptors are programmed by information in the same descriptors (and adapter logic responsive to that information) to perform various ancillary control functions relative to addressable I/O devices that conventionally would be addressed and controlled directly by a host (higher level) system processor (e.g., the processor that prepares the descriptors). The ancillary control functions are variable programmably in number (e.g., in the disclosed embodiment, one descriptor can define 0, 1 or 2 discrete ancillary control operations) and effects produced by each operation are programmably variable (e.g., ancillary operation can be used by the adapter to alter states of addressed devices; for example, to prepare a device that has been transferring data in one direction, in a half-duplex mode, for transferring data in the opposite direction, or to switch to a full duplex mode, etc.). These functions hitherto have imposed significant processing burdens on the host processor and functional constraints on the adapters and devices; typically, constraints requiring the adapter and one or more devices to be idled for the time required by the host to condition the device(s). Accordingly, delegation of these functions to the adapter, allows them to be carried out without idling of any system elements and while the host is otherwise productively occupied. Also, such delegation creates new applicational possibilities; e.g., having an adapter linked to a communication channel react to remotely originated signals and set up operations tightly coordinated in real time to previously executed operations (for example, retransmission of data previously received with detected error).

13 Claims, 5 Drawing Sheets

| # 1 | # 0 | Define |
|---|---|---|
| 0 | 0 | No auto-I/O operations |
| 0 | 1 | One auto-I/O operation |
| 1 | 0 | Two auto-I/O Operations |
| 1 | 1 | Unused/reserved |

Figure 7

Op 0: Defines first auto-I/O op as read or write
Op 1: Defines second auto-I/O op as read or write

| Wr 1 | Wr 0 | Second auto-I/O Write after a Read |
|---|---|---|
| 0 | 0 | Write D_Op2 contents to address [A_Op2] |
| 0 | 1 | Write value obtained on prior Read |
| 1 | 0 | Write complement of prior Read value |
| 1 | 1 | Reserved |

Figure 8

| Lch 2 1 0 | LLC Option |
|---|---|
| 0 0 0 | Chaining disabled |
| 0 0 1 | Chain on 0 Byte Count |
| 0 1 0 | Chain on AIS transition |
| 0 1 1 | Chain on 0 Count or AIS trans. |
| 1 0 0 | Chain on 0 Count followed by AIS |
| 1 0 1 | Reserved |
| 1 1 0 | Chain either on 0 Count followed by AIS or AIS per se |

COMPUTER I/O ADAPTERS FOR PROGRAMMABLY VARYING STATES OF PERIPHERAL DEVICES WITHOUT INTERFERING WITH CENTRAL PROCESSOR OPERATIONS

CROSS-REFERENCES TO RELATED APPLICATIONS

1) Continuation application Ser. No. 07/917,726, (now abandoned), filed Jul. 20, 1992 and titled "APPARATUS AND METHOD FOR RECEIVING SERIAL COMMUNICATION STATUS WITH A DMA CONTROLLER", discloses a programmable DMA controller/adapter having ancillary functional capabilities for gathering status information from a device to or from which data is being transferred, and for storing that information at a predetermined memory location associated with the memory space that is the source or destination of the transferred data.

2) application Ser. No. 08/024,981 (U.S. Pat. No. 5,448, 702), filed Mar. 2, 1993 and titled "ADAPTERS WITH DESCRIPTOR QUEUE MANAGEMENT CAPABILITY", discloses a Multi-Channel DMA controller that operates to enqueue and chain descriptors that are dispatched to it one at a time, at random intervals, wherein each descriptor programmably defines a variable length data block transfer process and each descriptor when dispatched is unchained (unlinked to any other descriptor).

BACKGROUND OF THE INVENTION

Known programmable DMA adapters and controllers are programmed by descriptors (or "descriptor blocks") prepared by a processor or microprocessor, and operate in response to such descriptors to control data transfers between an addressable memory system and peripheral devices; usually, over a bus that is accessible to multiple devices. Such adapters operate in a direct memory access mode; that is, they directly control memory addressing and control functions for each cycle of memory access. They also may operate as bus masters.

Information defining a series of data transfer operations relative to a group of contiguous memory address locations is usually contained in a single descriptor. Adapters which control multiple data transfer channels receive separate channel descriptor blocks (or CDB's) for each channel.

The memory and peripheral devices may be connected either directly, via a single bus, or indirectly via separate "memory bus" and "device bus" paths that are joined by the adapter. In the direct connection configuration, the data that is transferred propagates directly between the memory and devices, whereas in the indirect connection configuration it is buffered in internal registers or local memory in the adapter. In both configurations, system throughput is dependent upon how efficiently the adapter, devices and bus path(s) are used. Accordingly, it is desirable to minimize periods in which the adapter and devices are placed in "forced" states of idleness when new data transfer operations are being initiated.

CDB's defining successive data transfers in one adapter channel may be dispatched to the adapter either concurrently or sequentially, at random times. CDB's in a concurrently dispatched set are explicitly chained when dispatched; e.g., by an address pointer, in each CDB other than the last one in the set, defining the memory location of the next CDB in the set. Accordingly, the adapter usually operates without processor intervention or assistance to successively retrieve and process all of the CDB's in a concurrently dispatched/chained set.

As described in Related Patent Application 2, cited above, CDB's that are dispatched sequentially may also be handled as an implicitly or virtually chained set, i.e., they may be successively retrieved and processed by the adapter without processor intervention or assistance, but with the adapter creating and managing the chaining linkages between successively dispatched CDB's. In this mode of adapter operation, the adapter creates and manages linked list channel queues (separate queues for each channel), for handling dispatched CDB's that can not be immediately retrieved and processed. Each queue contains "head" and "tail" pointer information defining locations of first and last CDB to be processed; the first CDB being the one to be processed next, when the adapter is ready to do so, and the last CDB being the CDB last dispatched to the respective adapter channel. As CDB's are entered into "tail end" positions in such queues, the adapter inserts chaining pointers into the preceding CDB entry (via a memory Write operation), and as a next CDB is retrieved for processing, the chaining pointer link in that CDB becomes the new head pointer for the respective queue.

With this virtual chaining arrangement, the adapter and devices can be kept efficiently employed by the host processor system without "hogging" memory; i.e., the host processor need only allocate memory space for each CDB and the associated data transfer when the CDB is dispatched, whereas when CDB's are concurrently dispatched in an explicitly chained set, the host system must allocate memory space for all CDB's and all respective data transfers when the concurrent dispatch is effected.

Furthermore, with the virtual chaining arrangement the delegation of chaining queue management responsibilities to the adapter effectively reduces the processing load of the host system and frees the latter to perform other tasks which it might not otherwise be able to handle. It also enhances system productivity in other ways, since it allows for dispatching of CDB's while the adapter and devices are actively handling other data transfers; where batch dispatching of chained CDB's might require the adapter and devices to be in idle states of unpredictable duration while they are being prepared for a new descriptor chain. This idling requirement is needed primarily because the processor has no instantaneous awareness of the active state of any data transfer (receiving its state information through interruption handling processes that are entirely asynchronous to the transfer processes), and can not risk obstructing a current data transfer process while carrying out the dispatching procedure (with associated risk of causing an overrun or underrun in the respective transfer process).

Even with the virtual chaining capability described in Reference Patent Application 2, cited above, there are situations in which the processor would be unable to sequentially dispatch descriptors without having the adapter in an idle state. For example, if the adapter and a device are currently carrying out a half-duplex data transfer, and the next descriptor to be dispatched calls for the adapter and the same device to transfer data in the opposite direction, it could be necessary for the processor to change operating states of the device and/or adapter (to effect path reversal) before dispatching the next descriptor. However, this state change could not be carried out until the processor has determined that the adapter and device have completed their current transfer tasks; and since the interruption process by which the processor makes that determination may lag the actual completion event by an indefinite time, it is understood that in such situations the adapter and device could sit idle for a long time only because of this lack of processor coordination.

The present invention seeks to provide an adapter mechanism that effectively would eliminate this type of processing "roadblock", and thereby improve system efficiency. With this mechanism, an adapter could perform device reconfiguration functions, that ordinarily would be handled by a processor, and handle the performance in coordination with its other tasks so as to eliminate idleness or discontinuities in its activities.

Field of the Invention

This invention relates to programmable DMA (Direct Memory Access) adapters and/or controllers.

OBJECTS OF THE INVENTION

An object of the invention is to provide a DMA adapter having primary capabilities for transferring data between memory and peripheral devices in response to primary information contained in programmable chained descriptors, and secondary capabilities for variably controlling the peripheral devices in response to secondary information contained in the same descriptors, whereby states of peripheral devices can be changed by the adapter "on the fly" as it chains between descriptors.

Another object is to provide a DMA adapter, as just characterized, for use in a system containing a host processor which furnishes the adapter with the descriptors and which also has primary responsibility for controlling peripheral devices, wherein the adapter effectively can act as an I/O signalling surrogate of the host processor to control peripheral devices in coordination with data transfer processes that are "transparent" to the host processor.

Another object is to provide a DMA adapter, as previously characterized, having capability for performing I/O control signalling operations relative to associated peripheral devices in response to descriptor information, wherein devices to which such I/O signalling operations are directed may be different from devices to or from which data is being transferred.

Another object is to provide a DMA adapter, as previously characterized, having capability for automatically performing I/O control signalling operations relative to peripheral devices, including operations capable of reconfiguring a device, that is the destination of a concluded data transfer defined by a first descriptor, so as to reverse the direction of data handling and configure the device to serve as a source of data for a data transfer defined by a second descriptor chained to the first descriptor.

Another object is to provide a DMA adapter, as last characterized, having logical capability for transmitting control signals to peripheral devices by means of programmed operations that are defined by descriptors, and that are ancillary to data transfer functions defined by the same descriptors; whereby devices that are sources and destinations of the data transfers are synchronously controllable by the adapters without direct involvement of the host processor which prepares respective descriptors.

Another object is to provide a DMA adapter, as just characterized, having logical capabilities for controlling devices in response to programmed descriptors serving primarily to define data transfers, and wherein special safeguards are provided in the adapter to ensure that the state of a device is not altered prematurely by the adapter before the device has finished handling its part of a data transfer that is defined by the descriptor that defines the device controlling function.

SUMMARY OF THE INVENTION

Adapters configured in accordance with the present invention are programmable to perform "auto-I/O operations" in response to information contained in descriptors. These operations are therefore coordinatable with data transfer operations that are defined by respective descriptors. The descriptor information includes I/O device addresses and data useful to control (e.g., to alter states of) addressed devices.

Heretofore, device controlling operations of this type have been performed by processors which had no synchronism to data transfer processes that were being performed by the addressed devices. Accordingly, the devices, and possibly the adapter, would have to be in idle states while the controlling operations were being carried out; and that of course would potentially degrade the performance of all elements (the processor, devices, and adapter).

By delegating these functions to the adapter, in the manner disclosed herein, these controlling operations can be carried out by the adapter, "on the fly", as it chains between descriptors; so that the addressed devices need not be idle when controlled. And since performance of these operations by the adapter reduces the I/O connection time of the host processor, the operating efficiency of the latter is improved.

In accordance with this invention, auto-operations can be used for a variety of device control purposes. A descriptor can define programmed execution of a variable number of auto-I/O operations (e.g., 0, 1 or 2 operations in an embodiment to be described), and any auto-I/O operation so defined need not be directed to the device participating in a data transfer defined by the same descriptor. In fact, each auto-I/O operation can be directed to any device, device register or device port which can be addressed by the adapter. For example, an auto-I/O operation can be used to initialize one device for linkage to an adapter channel, while the adapter is concluding a data transfer with another device via the same or another channel.

As noted earlier, Related Patent Application number 1 above describes an adapter that is logically equipped for performing a fixed (non-programmable) set of "status information" transfer operations, between a predetermined device register and a predetermined memory location, as the adapter concludes a data transfer between the device that contains the predetermined register and a memory location associated with the predetermined location. In each such status transfer, information read from a device register (in an I/O Read operation) is written to memory (in a Memory Write operation), and the device register is cleared (in an I/O Write operation). Most of the parameters of such status transfer operations are predetermined and not subject to variation through programming. The address of the device register to be read and cleared is predetermined, as is the memory location into which the status information is written.

The auto-I/O operations of the present invention are uniquely different from the foregoing status transfer functions in the sense that their parameters are fully programmable. The address of a device register or port to be read or written via auto-I/O can be any address in the I/O address space accessible to the adapter, and need not be in a device currently engaged in a data transfer. The data written in an auto-I/O Write operation, can be used to alter the configuration or operating state of a respective device; e.g., to switch a communication device from operation in a full duplex mode to operation in a half-duplex mode, or to switch the direction of data transfer in a device currently transferring data in one particular direction.

Furthermore, since the number of "auto-I/O" actions is variable programmably (as mentioned above, in the embodiment to be described a descriptor can specify 0, 1 or 2 auto-I/O operations), and can be used to create unique effects. Consider for example, a descriptor defining an auto-I/O Read from a register in a first device currently coupled to one data transfer channel of the adapter followed by an auto-I/O Write to a register in a second device coupled to another data transfer channel of the same adapter or another adapter. Such pairs of operations can be used, for instance, to alter the state of operation of the second device in synchronism with a data transfer event detected by the first device (e.g., to request a remote sender linked to the second device to resend data erroneously received by the first device) and without intervention or burdening of any system processors. Those skilled in the art will understand the numerous potential advantages and effects that can be produced in this manner.

Also, a device controlled by an auto-I/O action need not be the same as the device to or from which a data transfer defined by the same descriptor is being conducted. Thus, an auto-I/O Write, defined by a descriptor being used to control a data transfer in one adapter channel, could be used to prepare a device for data transfers relative to another adapter channel (e.g., a channel currently idle or inactive), and thereby minimize the time needed to prepare the other device; particularly, where there is a requirement for time coordination between the data transfers in the two channels.

The adapter arrangement described in Related Patent Application 1 above operates relative to a "memory" bus which directly couples to the memory, the adapter and the devices to or from which data is being transferred. However, in a preferred embodiment of the present invention, the adapter interfaces between a memory bus—which serves system memory, the adapter and the host processor—and a separate peripheral bus which serves the devices to or from which data is being transferred. Thus, in this environment, the adapter may be used to control interrupt status transfers relative to devices not directly interrogatable by the host processor, and also it may be programmed to perform auto-I/O operations serving to control devices that are not directly accessible to the host processor.

In the preferred embodiment, descriptors/CDB's are dispatched to the adapter sequentially, in the manner described in Related Patent Application 2, via request signals containing pointers to storage locations of respective CDB's in memory. The present adapter may control data transfers concurrently relative to multiple devices, through multiple internal data buffering channels in the adapter, and if so the adapter receives CDB's separately relative to each channel in the manner also taught in Related Patent Application 2 above.

The CDB's that are dispatched to the subject adapter have unique programmable fields designating the subject auto-I/O operations. These fields permit the host processor to condition the adapter for performing auto-I/O operations, relative to any device(s) that are connected to the peripheral bus, which in single bus system environments would normally be performed by the host processor itself and in dual bus environments would normally be performed by the host processor through cooperative actions involving the host, the adapter and device(s).

Since the foregoing auto-I/O functions can alter device states, it is important that they not be carried out "prematurely". The invention includes a safeguard feature that ensures that auto-I/O functions are not initiated prematurely. Prior adapters normally detect completion of a block data transfer when the value of a transfer count, representing the number of bytes remaining to be transferred by the adapter, decreases to 0. However, if the adapter were to condition its auto-I/O actions on detection of a 0 transfer count value these actions could be taken erroneously.

Assume, for example, that a 0 value denotes transfer of a block of data to device serving as a buffer between the adapter and a communication link; i.e., the device is temporarily storing the data in a buffer and forwarding it to the communication link from that buffer. Assume also that the device has a large buffer storage capacity, and that the auto-I/O action is one capable of altering the state of that device. Thus, when the value of the adapter's transfer count reaches 0, the device may still be holding data in its buffer that needs to be transferred, and altering the device state before its buffer is emptied could cause erroneous operation of the device.

Accordingly, the descriptors (CDB's) can determine the logical conditions for detection of completion of CDB data transfer handling, with some logical conditions preventing detection until a device receiving data from the adapter and forwarding that data (e.g., to a network) has returned an "asynchronous input signal" (AIS) to the adapter signifying completion of its forward handling of the data.

A preferred DMA adapter described herein supports operations relative to respective internal channels in a "Linked List Chaining" (LLC) mode. Various chaining options are definable in this mode. These LLC chaining options are programmably specified by channel configuration information contained in CDB's. Several of these options condition require the adapter to recognize reception of an AIS signal from a device as one condition for detecting a chaining event.

Relative to channels configured for LLC mode operations, unchained/unlinked CDB's are dispatched to the adapter sequentially, at random times, in accordance with Related Patent Application 2 cited earlier. In the dispatching operations, request signals are transferred to the adapter which contain pointers to memory locations of respective CDB's. The adapter enqueues the pointers, and respective CDB's, in a linked list queue created by the adapter, and controls retrieval and processing of the CDB's in the order of reception of respective pointers. LLC chaining options defined in the dispatched CDB's determine the logical conditions for adapter detection of "chaining events" denoting completion of a CDB data transfer processing. Detection of chaining events determines when the adapter initiates auto-I/O actions, as well as when the adapter initiates retrieval of a next CDB from its linked list queue.

The foregoing and other features, advantages and benefits of the present invention will be more fully understood and appreciated from the following description and claims.

DESCRIPTION OF THE ILLUSTRATIVE EMBODIMENT(S)

1. System Environment

Figure 1:
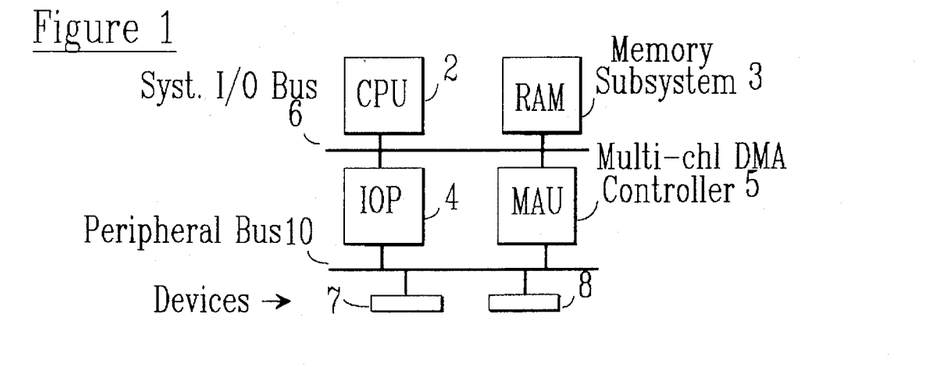
FIG. 1 is a schematic diagram of a prior art system environment in which the present invention can be used to advantage.

FIG. 1 shows a typical prior art system environment in which a DMA adapter/controller configured in accordance with the present invention may be advantageously used. Other environments are discussed with reference to the same figure.

The system includes a CPU 2, a memory subsystem 3, an I/O processor (IOP) or microprocessor 4, a multi-channel DMA adapter/controller 5, and peripheral devices 7, 8. IOP 4 and adapter 5 interface to CPU 2 and memory subsystem 3 through a system bus 6 potentially shared by additional system elements (not shown). IOP 4 and adapter 5 interface to devices 7, 8 through a "peripheral" bus 10 potentially shared by other (not shown) adapters and many other (not shown) peripheral devices. Memory subsystem 3 may contain RAM (random access memory) modules, ROM (read only memory) modules, and other addressable memory modules.

In this environment, a DMA adapter/controller ordinarily operates to control direct access to memory subsystem 3, and to transfer data between that subsystem and elements addressable as I/O attachments to the system; i.e., devices such as devices 7 and 8. In variations of this environment, all elements of the system, including the devices, connect to a common bus, and the adapter controls access to memory but does not handle data being transferred between the memory and devices.

In either environment (two bus or one bus), data transfer operations of the adapter may be programmed by means of Channel Descriptor Blocks (CDB's) that are prepared in memory 3 either by CPU 2 or IOP 4. Each CDB defines a data transfer between a preassigned block of storage spaces in memory 3 and a device. CDB's dispatched for processing relative to a channel may be processed either in a chaining mode, in which the adapter successively retrieves and processes CDB's without coming to a halt, or in an unchained mode in which the adapter and device are halted after conducting a data transfer defined by one CDB and initialized for processing a next CDB.

CDB's that are to be processed in a chaining mode are dispatched to the adapter either in a single batched set or sequentially. The sequential dispatch mode is described in Related Patent Application 2 cited earlier. In the system configuration of FIG. 1, the dispatching functions are accomplished by means of signals presented to the adapter either by CPU 2 or IOP 4.

In batched dispatch handling, a set of sequentially ordered CDB's is dispatched all at once. Each CDB in the set, other than the last one to be processed, contains a linking pointer to the (memory location of a) next CDB in the set; and the adapter is explicitly given a pointer to the first CDB in the set. Each CDB also contains a pointer to a block of space in memory allocated for the data transfer defined by the respective CDB (i.e., as the source or destination of respectively transferred data). The adapter retrieves the first CDB in the set, using a respective pointer, and performs the data transfer defined by that CDB. Then the adapter chains to the next CDB in the set, using a pointer contained in the first CDB to retrieve the next CDB, and processes the next CDB. Continuing in this manner, the adapter retrieves and processes all of the CDB's in the set, in the order defined by the linking pointers.

Sequential dispatch handling, described in Related Patent Application 2 cited earlier, allows the processor to prepare and dispatch unchained CDB's to a given adapter channel at random times, one at a time, but have the dispatched CDB's processed by the adapter as if they were chained in a batched set. This type of CDB handling enables the processor to use memory more efficiently (since it need only reserve data storage space in memory for CDB's which have been dispatched to a channel and not fully processed by the adapter, whereas the batch mode requires reservation of storage space for data transfers defined by all dispatched CDB's).

In the sequential mode, CDB's are dispatched to the adapter one at a time without chaining pointers (i.e., without pointers to memory locations of other CDB's), and processed sequentially by the adapter, in the order of their dispatch. When unable to immediately process such CDB's, the adapter creates chaining linkages between them. During the dispatch signalling process, the adapter receives signals indicating the adapter channel targeted, and a pointer to the memory location of a CDB being dispatched to the targeted channel. When unable to immediately process a dispatched CDB, the adapter enqueues it as the last element in a Linked List Queue (LLQ) that it (the adapter) constructs and maintains separately for each of its channels. Relative to each channel queue, the adapter operates in a Linked List Chaining (LLC) mode to retrieve and process CDB's in the order of their entry into the queue.

Each queue is defined by a table of pointer information that is held in dedicated registers in the adapter; including a Queue Head Pointer (QHP), that indicates the location of a "next" CDB (which is to be retrieved and processed next relative to the targeted channel after the adapter finishes a current data transfer), and a Queue Tail Pointer (QTP)indicating location of a "last" CDB (the one last entered in the queue, which is to be processed last). With each new CDB queue entry, the adapter modifies the QTP to point to the newest entry, and writes the previous value of the QTP, as a "chaining pointer, into the CDB representing the preceding entry if the latter CDB has not been retrieved for processing.

Upon concluding a data transfer in LLC mode, the adapter stores status information in memory 3 indicating the concluding status of the operation, and of the adapter channel and device involved in the operation. The status information is stored in a memory location associated with a "chain pointer" to the next CDB in the queue, or (when the queue is empty) in a predetermined memory location (on defined by a predetermined address that is set into the adapter by the processor that dispatches the CDB's, and held in an adapter register that is overwritten by the chain pointer when the queue is not empty).

In association with storage of status in memory, the adapter signals an interrupt request to the appropriate processor (the processor which processes the status information), and at some indefinite later time the respective processor retrieves and processes the status information (e.g., to determine if the associated data transfer process was concluded successfully or aborted due to error or other circumstance, and possibly to decide if the transfer process has to be repeated, etc.). Having status stored by the adapter in this manner has several system advantages, including: (1) relieving the processor of the burden of performing the I/O signalling otherwise required to retrieve status; and (2) reducing internal memory required in the adapter to hold status information.

Having the adapter perform such status transfers is described in Related Patent Application 1 cited earlier, and is not part of the novelty of the present invention. Furthermore, related Patent Application 1 describes how the I/O functions required to retrieve status from a peripheral device involved in a data transfer can be performed by a DMA adapter in line with its handling of CDB processing. In the arrangement described in Related Patent Application 1, the adapter signals an I/O Read to a particular status storage register (or register bank) in the device involved in a data transfer that has just concluded, then signals an I/O Write to the same status register to clear it, and then signals a Memory Write to store the device status information into a memory location preassigned for status storage.

The foregoing adapter operations are "non-programmable"; in the context that they are performed always relative to a predetermined I/O address of a predetermined device status register, and always relative to a predetermined memory address that is determined by data storage address parameters of the CDB defining the just-concluded data transfer. As noted next, there are problems or bottlenecks in system operation that could be eliminated if the adapter could perform programmable operations as adjuncts to its CDB processing; specifically, programmable operations (hereafter termed "auto-I/O" functions) which can be programmed (by a host processor) in respect to I/O address selection and number and types of operations to be conducted.

2. Problem To Which Invention Is Directed

As implied above, there are specific "I/O" problems or bottlenecks, in processing system operations, that could be alleviated by being able to delegate certain functions (those presently termed auto-I/O functions) to adapters on a programmable basis (in which address and other parameters would be subject to programmable definition in CDB's by host processors and their users); particularly, adapters capable of operating in LLC (Linked List Chaining) mode. Representative examples of these situations are described next.

a) Consider, as a first instance, the case where a device must be reconfigured between two data transfer processes; e.g., to reverse direction of data handling in a communication or network interface device having bidirectional functional capabilities but operating currently to transfer data in only one direction. In such cases, traditionally, the host processor must wait for the device and adapter channel to come to a full halt, and then reconfigure both (via I/O signalling) while both are idle. The wait and idleness are of indeterminate duration, since the host does not learn of their halted status until it processes an adapter interruption, and the adapter's processing of such interruptions has indefinite time relation to respective interruption request signals, since it is determined by processing task workloads and other variable factors. The indefinite idleness of adapter channel and device tend to adversely affect system performance, and the actions required of the host processor for reconfiguration are also capable of adversely impacting system performance. Furthermore, the required reconfiguration prevents the host system from scheduling the data transfers preceding and following reconfiguration by means of chained CDB's, or even successive CDB's that are to be processed by linked list chaining, so that the delay in dispatching and initiating processing of the CDB after configuration tends to adversely impact performance.

b) As a second instance, consider the case where a data transfer process being conducted through a communication device operating through one adapter channel is required to be modified or repeated because of an error; e.g., an error remotely communicated through another device and either another adapter or another channel of the same adapter. In this situation, the host processor cannot initiate appropriate action until the adapter and target device (the device through which data is being transferred) have concluded all valid CDB processes previously dispatched, and this cannot be determined by the host processor until an indefinite time following such conclusion, for reasons stated in the first example. Accordingly, a process which conceivably could be corrected by having the adapter simply reprocess a CDB that it has recently processed, might require considerable idleness of the adapter and device, as well as considerable I/O involvement by the host processor (to set up the reprocessing functions).

Those skilled in the art are expected to understand that the foregoing are only two among many situations in which dispatching of data transfer processes can be delayed by a requirement for the host processor to detect and react to a condition requiring reconfiguration of a device, and requiring that the reconfiguring action be taken when (or delayed until) the respective device is idle (as otherwise such action could interfere with a data transfer). The present invention involves recognition that such delays in processor actions are detrimental to system throughput, and can be either avoided entirely or reduced by orders of magnitude if the adapter could be empowered to act as surrogate for the host processor in performing respective actions; particularly, if parameters of adapter operations needed for that purpose could be programmed into previously unused bit spaces of existing CDB formats. The auto-I/O capability to be described next results from this recognition.

3. Auto-I/O Capability—General

Figure 2:
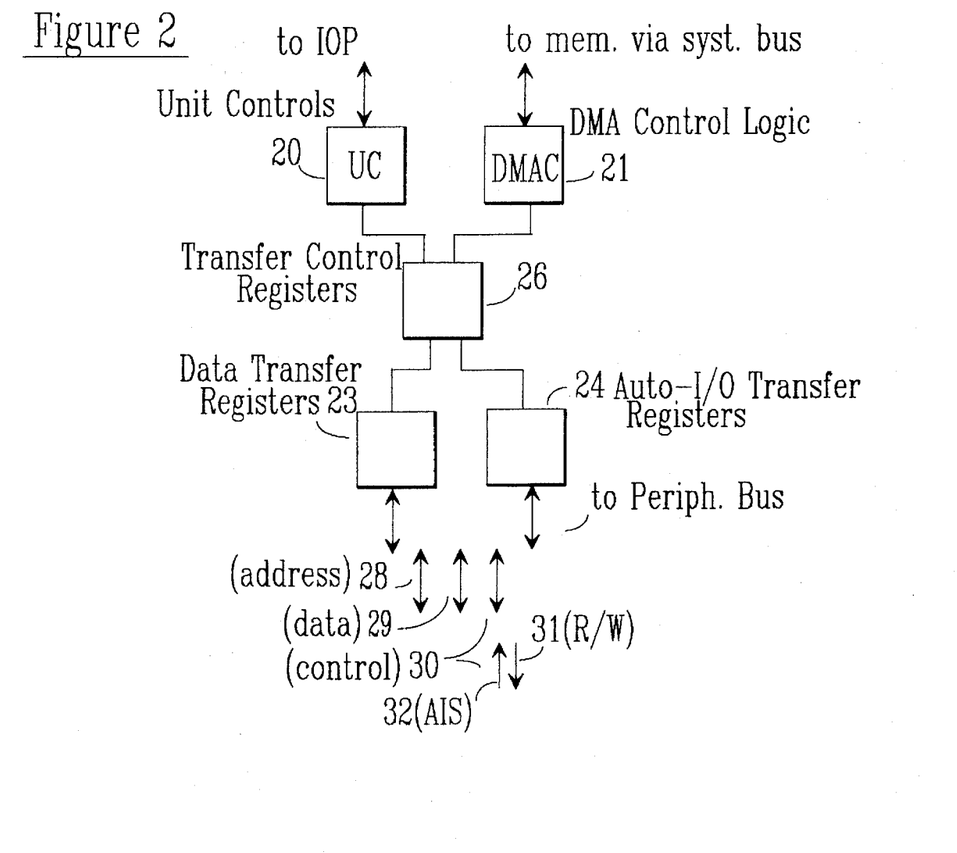
FIG. 2 is a schematic block diagram of a Multi-Channel DMA Adapter/Controller configured in accordance with the present invention.
Figure 3:
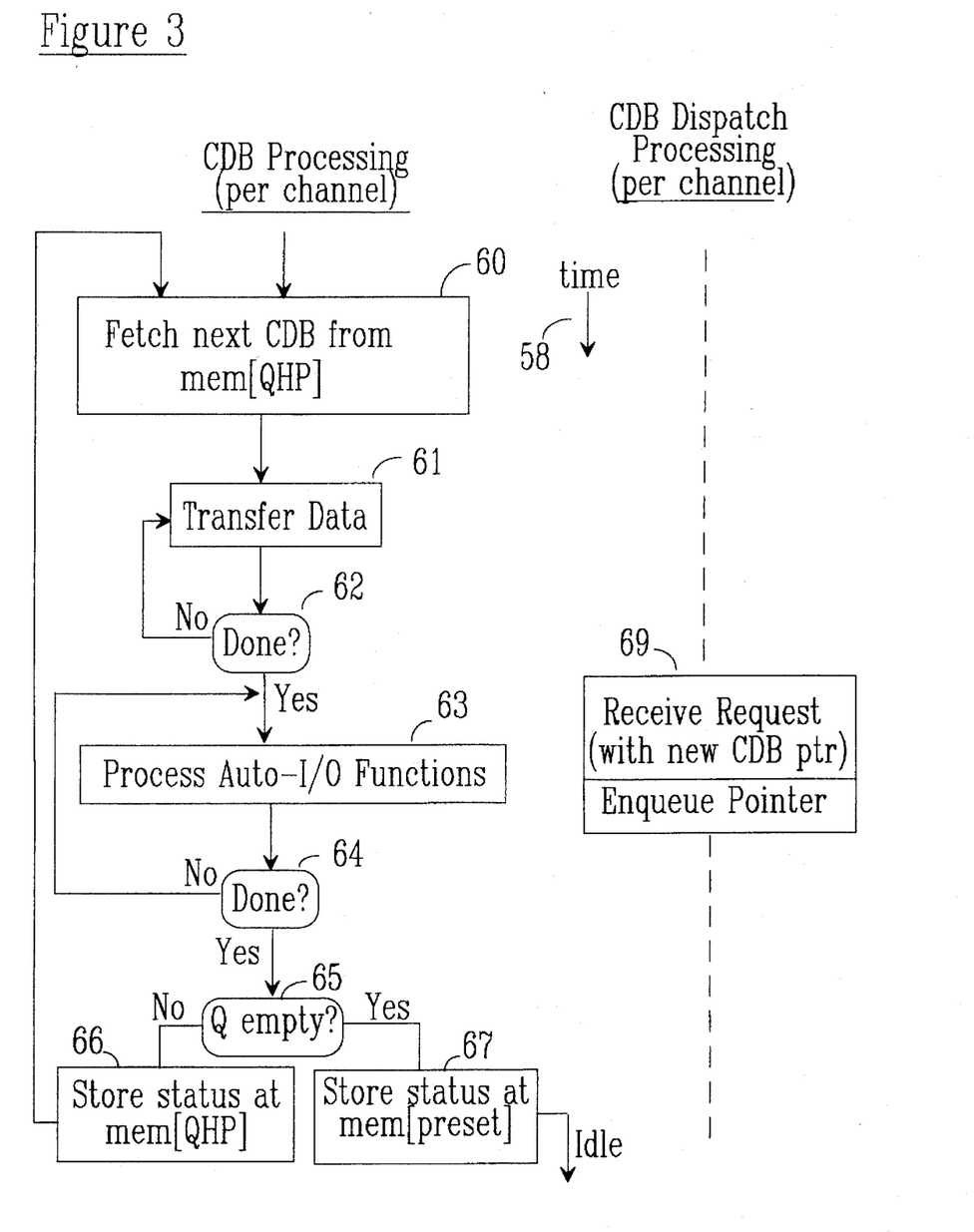
FIG. 3 is a flow diagram illustrating how the adapter of FIG. 2 operates in Linked List Chaining mode (in accordance with teachings of Related Patent Application 2 cited above), and how it incorporates auto-I/O functions of the present invention into its operations in that mode.

FIGS. 2 and 3 are used to describe general aspects of the present auto-I/O capability. FIG. 2 shows general aspects of the adapter logical organization for supporting this capability, and FIG. 3 shows in a general context the sequence of execution by an adapter of data transfer and auto-I/O functions defined by a common CDB.

Referring to FIG. 2, a DMA adapter in accordance with the present invention can be viewed as logically organized into 5 sections, numbered 20, 21, 23, 24, and 26. Section 20 interfaces the adapter to the processor which dispatches CDB's. Section 21, the DMA Control (DMAC) section, interfaces the adapter to system memory via the not-shown system bus. Sections 23 and 24 interface the adapter to the (not-shown) peripheral bus; section 23 for transferring data and section 24 for carrying out auto-I/O signalling functions in accordance with the invention. Section 26 contains the registers which control the adapter; including those which contain CDB information, those which contain Linked List Queue information, etc. Sections 21, 23, 24 and 26 have separate register banks and control logic for each adapter channel.

As shown at 28–32, the peripheral bus interface contains address lines 28, data transfer lines 29, and control lines 30. The address lines are used by the adapter to signal an I/O address designating the device or device component (register, port, etc.) to or from which data or other information is to be transferred. The data lines are used to transfer the data or other information. Control lines 30 include a direction indicating line 31 and an AIS signalling line 32. Line 31 is controlled by the adapter to indicate the direction of each transfer as Read or Write (Read denoting a transfer from the addressed device to the adapter and Write a transfer from the adapter to the device). Line 32 is used by the adapter to receive an Asynchronous Interface Signal (AIS), from certain devices, that is used by the adapter, in certain channel operating modes, for conditioning chaining logic to prepare for chaining to a new CDB.

FIG. 3 provides a general characterization of CDB handling operations performed by the subject adapter in LLC (Linked List Chaining) mode, indicating the sequence of execution of data transfer, auto-I/O and other functions. The direction of increasing time is indicated by arrow 58. Operations associated with CDB (data transfers, auto-I/O functions, status storage, etc.) are indicated at the left, by items 60–67, and operations associated with handling "CDB Requests" from a host processor (requests dispatching individual new CDB's to the respective channel) are indicated at the right by item 68.

CDB processing, relative to an adapter channel, starts at 60 with retrieval of a "next" CDB from a memory location defined by the current value of the QHP (Queue Head Pointer) of the LLC (Linked List Queue) assigned to the respective channel. The symbol "mem[QHP]" is used to represent a memory location having a predetermined offset from the memory position indicated by this QHP value. If the queue is not emptied by this retrieval, the retrieved CDB will contain a chaining pointer (CP) value that defines the location of the next CDB to be processed after the retrieved CDB. Although not shown in FIG. 3, it should be understood that the CP value taken from the retrieved CDB becomes the new QHP value of the respective channel's LLQ (refer to Related Patent Application 2).

This is followed by operations indicated at 61 and 62, for transferring a varied length block of data between a block of memory storage space defined in the CDB and a device currently linked to the respective channel. When the data transfer is finished, the adapter handles auto-I/O processing indicated by items 63 and 64. In these actions, the adapter performs a number of discrete auto-I/O operations to be described (0, 1 or 2 operations), where the number of operations, the I/O addresses targeted in each operation, and the direction of each operation are defined "programmably" by information in the CDB being processed.

At completion of auto-I/O handling, the adapter stores status information defining the status of all operations designated by the respective CDB. This information includes device status information gathered by the adapter at this phase of its operation (refer also to Reference Patent Application 1). The status information is stored in memory at a location which depends on the current state (empty/not empty) of the channel's Linked List queue (determined at 65). If the queue is not empty, status is stored at a memory location having a predetermined offset from the location defined by the new QHP value (operation 66), and the adapter immediately repeats operations 60–64 relative to the CDB located by the new QHP value. If the queue is empty at determination 65, status is stored at a location defined by a pointer function (mem[preset]) that is preset in the adapter, by the host processor, at system startup (operation 67).

In request/dispatch handling (actions 68), the adapter receives request signals from the host processor. As intended to be suggested by the dashed lines entering and leaving box 68, and the offset time position of that box relative to actions 60–67, a request may be received at any time (i.e., while the respective channel is either idle or active, and if active at any phase of its activity). Each request is addressed to a port exclusively associated with one channel (refer to Related Application 2), and thereby impliedly is addressed to that channel, and contains a pointer to the memory storage location of an associated CDB that has been prepared by the host processor. At this time, the associated CDB is unchained/unlinked (i.e., it contains no information linking it with any other CDB).

If the channel is inactive/idle when the request is received (LLQ empty and no CDB currently being processed), the adapter immediately initiates retrieval and processing of the CDB located by the request pointer. However, if the channel is active at this time (LLQ not empty), the adapter enqueues the associated CDB into the tail end position of the respective channel's LLQ. In the latter action, the adapter replaces the queue tail pointer (QTP) value of the respective LLQ with the pointer value contained in the latest request. If the queue contains other CDB's when this occurs, the replaced QTP function is used to locate the CDB associated with that function, and the new QTP value (the request pointer value) is written to a "chain pointer" (CP) space within that CDB. Thus, each CDB at other than the tail end position of an LLQ contains a chain pointer function defining the memory storage location of a next CDB in the respective queue.

4. Channel Control

Figure 4:
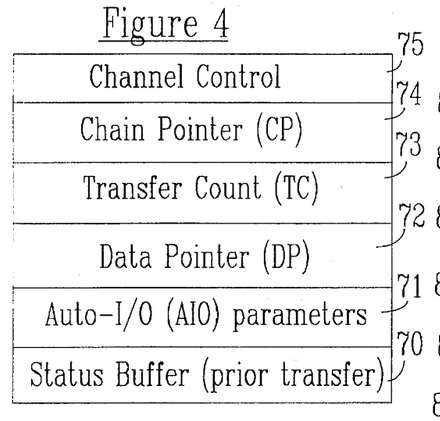
FIG. 4 illustrates information content of a CDB configured in accordance with the present invention.
Figure 5:
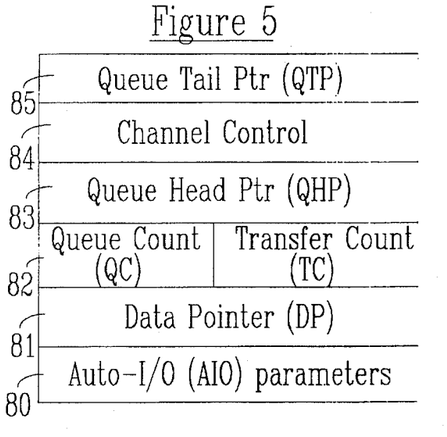
FIG. 5 illustrates (per channel) registers in the adapter of FIG. 2 that serve to control or hold information pertaining to data transfer, auto-I/O and CDB chaining operations conducted relative to a respective adapter channel.

FIG. 4 shows memory storage space assigned to a CDB, and FIG. 5 shows presently relevant adapter control information parameters pertaining to LLQ management and CDB processing. It should be understood that information elements of a CDB undergoing processing relative to an adapter channel are held by the adapter in registers dedicated to the respective channel. Furthermore, it should be understood that information needed by the adapter for linked list queue management (some of which is contained in the CDB currently being processed) also is held in adapter registers dedicated to the channel.

FIG. 4 shows storage spaces assigned to a CDB; assumed to be one dispatched to an adapter channel operating in Linked List Chaining/Queueing (LCH) mode. The spaces are virtually (but not necessarily physically) contiguous in memory. Numerical legends 70–75 indicate the spaces in the order of assigned (virtual) addresses (e.g., in the order of progressively ascending addresses). As noted earlier, when dispatched to the adapter, these CDB's are entered by the adapter into a channel linked list queue (LLQ). The dispatching request provides the adapter with a pointer to storage space 70. Space 70, vacant at the time of dispatch, is reserved as a buffer for storing concluding status for the adapter's processing of the prior CDB in its LLQ.

Space 71 contains information defining the presently relevant auto-I/O functions. Space 72 contains a data pointer DP designating the starting address in memory at which transferred data is to be read or written. Space 73 contains a transfer count value defining the aggregate number of data bytes to be transferred in the data transfer. Space 74, initially vacant, is used by the adapter to store a chain pointer function CP designating the starting address for the storage space containing the next CDB entered into the respective LLQ. Space 75 contains control information pertaining to the channel operation (direction of data transfer, interruption mode, etc.). Some elements of the last mentioned information are discussed below with reference to FIG. 5A.

FIG. 5 shows the adapter register organization (per channel) for management of LLQ and LCH functions. Each section, 80–85, represents a discrete register or register bank assigned to the respective channel.

Registers 80 hold information defining auto-I/O functions to be performed as part of the current CDB process. Registers 81 hold a varying data pointer DP for the data transfer phase of the current CDB process; this pointer being initialized to the value of the DP function contained in the CDB at the start of the process, and thereafter successively modified (e.g., incremented) as data is transferred. Registers 82 hold variable count functions; including a queue count (QC) and transfer count (TC). QC denotes the number of CDB's currently enqueued, and TC, which is initialized to the value of TC contained in the CDB before any data is transferred, tracks the number of data bytes remaining to be transferred. Register 83 holds the queue head pointer QHP, which, as explained earlier, defines the memory storage location of the next CDB to be dequeued (after any current CDB process is concluded). Registers 84 contain other control information discussed below with reference to FIG. 5A. Finally, register 85 contains the queue tail pointer QTP, which, as explained earlier, defines the storage location of the CDB last entered into the queue.

Figure 5A:
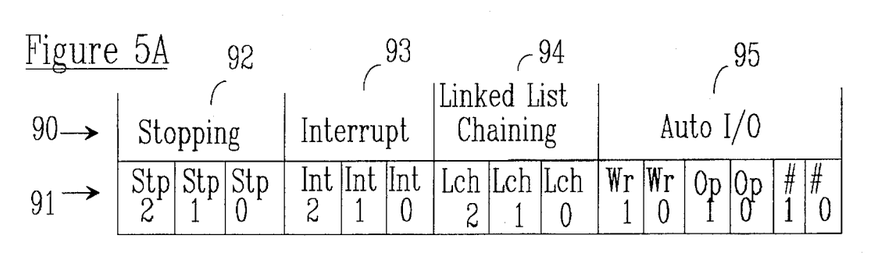
FIG. 5A illustrates details of registers in FIG. 5 that define operating modes relative to an adapter channel, and functions associated with Linked List Chaining mode.
Figure 5B:
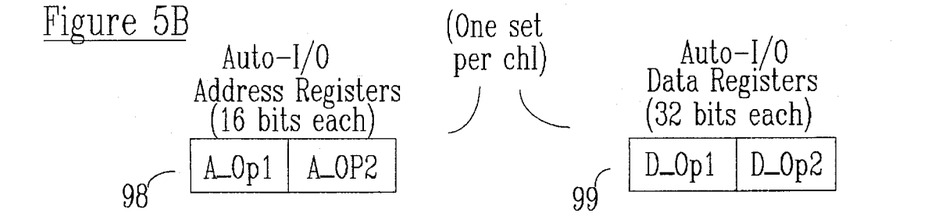
FIG. 5B illustrates details of controller channel registers that hold addressing and data parameters associated with auto-I/O operations.

FIG. 5A lists particular items of channel control information associated with item 84 in FIG. 5, and FIG. 5B shows the register deployment of address information and data associated with auto-I/O functions (corresponding to registers 80 in FIG. 5).

In FIG. 5A, table headings/categories are indicated at 90 and control functions falling under each category are indicated at 91. The functional categories are stopping 92, interrupt signalling 93, linked list chaining 94, and auto-I/O 95. Each of categories 92–94 has several selectable options defined by a combination of 3 bits. Category 95 has four selectable options, two of which are defined by encoded combinations of values of pairs of respective bits; the other two being individually defined by values of single bits.

Stopping options 92 and interrupt options 93 have no particular relevance to the present invention. Stopping options 92—defined by encoded combinations of bits Stp 0, Stp 1, and Stp 2—designate different conditions and procedures for bringing channel operations to a halt. Interrupt options 93—defined by encoded combinations of bits Int 0, Int 1, and Int 2—define different conditions and procedures for presenting interrupt requests to the processor that handles status.

Link chaining options 94 are defined by encoded combinations of bits Lch 0, Lch 1, and Lch 2. Certain of the encoded values (see discussion of AIS detection and usage with reference to FIGS. 8 and 9, below), have relevance to a "safeguard" feature of the present invention (which ensures that chaining to a next CDB is not initiated prematurely).

Auto I/O options include a "number" designating option, designated by encoded values of bits #0 and #1, two operation designating options respectively defined by values of single bits Op 0 and Qp 1, and write defining options which are effective only when certain of the other options are in effect.

FIG. 5B shows registers at 98 and 99 respectively used for address and data parameters of auto-I/O operations. As noted earlier, each CDB in an LLQ can call for execution of either 0, 1 or 2 auto-I/O operations.

Address registers 98 hold address functions defining I/O addresses to be used in these operations. These addresses are supplied (programmably, in the context that these values can be set by programmed operations of the processor that creates the CDB's, and can range in value over a range encompassing all device and device component addresses that may be desired objects of auto-I/O functions) in the CDB that is currently being processed (reference parameters 80, FIG. 5). A_Op1 holds the (device or device component) address to be used in a single auto-I/O operation, or in the first of two such operations. A_Op2 holds the address to be used in the second operation when number of auto-I/O operations is indicated to be 2.

Data registers 99 hold information transferred by auto-I/O operations. D_Op1 is a dedicated adapter register which is the source or destination of data to be transferred in a single or first of two auto-I/O operations (the source if the operation is a Write, and destination if it is a Read). D_Op2 is a dedicated adapter register which can be the source or destination of data transferred in a second of two auto-I/O operations.

Figure 6:
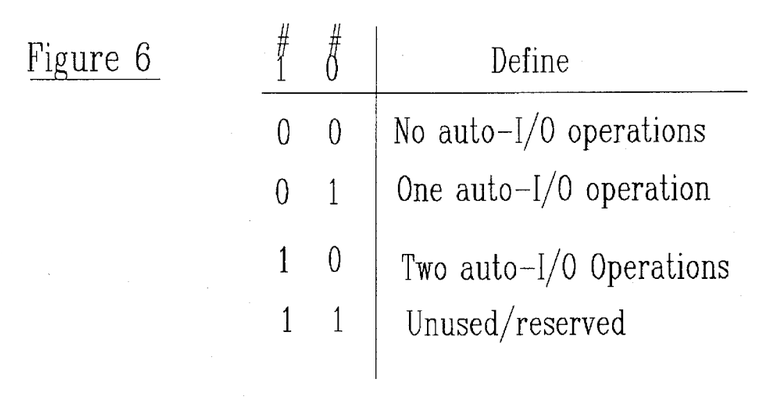
FIG. 6 is a table showing how the number of auto-I/O operations to be performed during a current CDB channel process is defined (programmably) by a specific combination of number-defining bits, #1 and #0, that are held in the registers of FIG. 5A.

The table in FIG. 6 shows the number bits—#0, #1, and #2—as defining performance of either 0, 1 or 2 auto-I/O operations. The number bits are supplied (programmably) in the CDB currently being processed (reference parameters 80, FIG. 5). Actions taken when the number defining bits designate at least one operation are shown in FIG. 7.

Figure 7:
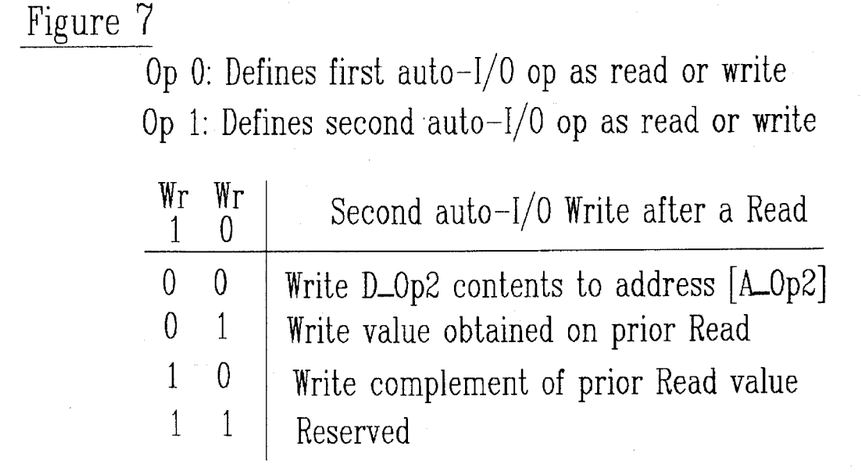
FIG. 7 is a table indicating auto-I/O operations evoked by specific combinational values of channel control option bits shown in FIG. 5A.

FIG. 7 contains two statements, showing functions defined individually by bits Op 0 and Op 1, and a table showing Write mode choices for the second auto-I/O operation, defined by bits Wr 0 and Wr 1, when the number of such operations is defined to be 2, and bit Op 1 (as explained below) defines the second operation to be a Write. The Op and Wr defining bits are supplied (programmably) in the CDB currently being processed (reference parameters 80 FIG. 5).

The first statement in FIG. 7 indicates that when the number option defines other than 0 operations, the direction of the first operation (if the number is 2) or only operation (if the number is 1) is defined by bit Op 0 as either a Write or a Read (Write from adapter register to device or device component; or Read from device/component to adapter register). The second statement in FIG. 7 indicates that when the number option calls for 2 operations, the direction of the second operation, Write or Read, is defined by bit Op 1.

The table portion of FIG. 7 (below the statements defining Op 0 and Op 1) shows how values of Write defining bits Wr 0 and Wr 1 are combinationally interpreted when the number calls for 2 operations and Op 1 defines the second operation to be a Write.

In this situation, the table entry next to 0 values for both Wr bits indicates that the data to be written is located in register D_Op2 (see FIG. 5B). Typically, in this particular type of action, the data contained in register D Op2 will be data supplied by the host processor in the current CDB (reference 71, FIG. 4), which of course will be placed in register D_Op2 by the adapter logic prior to the auto-I/O sequence.

The two following entries in this table indicate the action taken when the second operation is a Write following a first operation Read. In this situation, the data written will be either the data previously read or its complement; and typically its source will be register D_Op1 (i.e., the register that receives the data in the Read operation). In the preferred embodiment, the data that was read in the Read operation is also stored with status information (e.g., concatenated to the status information) when the adapter concludes auto-I/O handling (see items 66 and 67, FIG. 3).

The last entry in the table is a presently unused code position potentially useful for another form of Write action; e.g., one requiring special logical manipulation of data by the adapter prior to the Write.

5. Linked List Chaining Options

Figure 8:
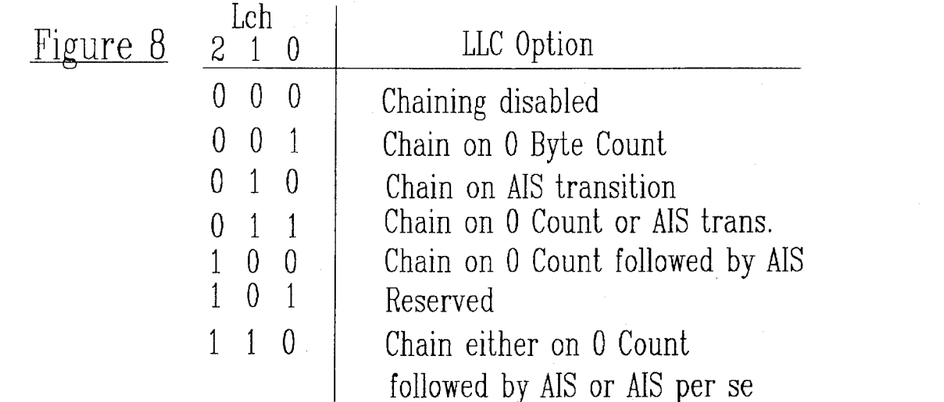
FIG. 8 is a table indicating how the adapter interprets/decodes channel chaining option bits shown in FIG. 5A.

Upon completion of data transfer and auto-I/O processing phases of a channel process defined by a current CDB, and assuming that the prior operations have concluded without error, an adapter running in LLC mode will detect a chaining event and perform an action determined by its current chaining option. Logical conditions for detection of a chaining event are determined by the channel's current chaining option. The chaining options, shown in FIG. 8, are defined by Link Chaining bits Lch0, Lch1 and Lch2 (typically, supplied in the channel control information of a CDB currently being processed). If linked list chaining is disabled (option "000"), the adapter can operate only in conventional modes not presently relevant (e.g., batch chaining or handling individual CDB's without linked list enqueueing). If linked list chaining is not disabled, when the adapter detects a chaining event it will store status and dequeue a next CDB if the respective channel's linked list queue is not empty (reference actions 66, 67 and 60, FIG. 3).

When chaining event detection is conditioned on "byte count=O" (option "001"), the adapter detects a chaining event only when the decremented value of its transfer byte count reaches 0; i.e., when all data byte transfers have been completed by the adapter.

Figure 9:
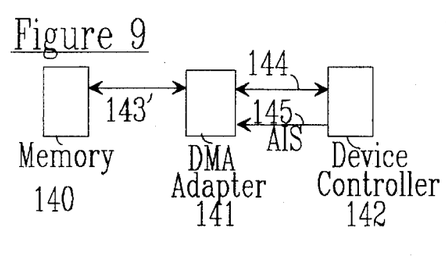
FIG. 9 is a block diagram showing how the adapter connects to a device that has internal data buffers.

Other options, shown in FIG. 8, involve logical consideration of the AIS (asynchronous interface signal) function (reference line 32, FIG. 2 and the following discussion of FIG. 9).

As shown in FIG. 9, data is transferrable between memory 140 and the present adapter 141, and between the latter and device controller 142. Data transfers at the memory interface are conducted over bus lines 143, and those at the device controller interface over lines 144. In the latter transfers, AIS line 145 can be pulsed by the device controller to signal completion of its part of the data transfer process. The pulse transition is detected by the adapter and can be used (depending upon its current chaining option) to condition logical detection of a chaining event. Of course, in a data transfer process defined by a single CDB all of the data is transferred in one direction (i.e., from device controller to adapter to memory, or from memory to adapter to device controller).

If the AIS line is connected to a device controller containing an internal buffer, it is understood that the AIS pulse transition originated by the controller will occur either before or after the adapter channel's byte count reaches 0 (before if the data is transferring to memory and after if it is coming from memory). The delay between these events (AIS transition and byte count reaching 0) is a function of the size of the device controller's buffer and, in respect to data being forwarded through a device (e.g., through a communication device to a remote terminal), conditions at the forwarding interface of the device.

Now assume that the adapter has the ability to reprocess a CDB if error is detected during the original processing of that CDB. If the error should occur after the adapter channel byte count reaches 0 (e.g., while data is being remotely forwarded by a device), and if the adapter were to initiate linked list chaining when its byte count reached 0, the adapter would be unable to reprocess the CDB just processed (because it would have saved status and retrieved the next CDB, and the next CDB has no chaining pointer to the previous one in the preferred embodiment that has been described). This is avoided by using chaining options associated with the AIS transition (which, in the case of forwarding transfers through a device could be made to occur only after all of the data has been successfully forwarded; so that any prior error indications could be used by the adapter to initiate reprocessing).

Accordingly, chaining options provided presently that depend on the AIS function (FIG. 8) are to chain on: AIS transition only (option "010"), 0 count or AIS transition (option "011"), 0 count or AIS transition whichever occurs first (option "011"), 0 count followed by AIS transition (option "100"), or either a 0 count followed by AIS transition or AIS transition whichever occurs first (option "110"). An unused option code (101) is reserved. Applications of these options are explained next.

The options to chain only on AIS transition, or 0 count followed by AIS transition, or either 0 count followed by AIS or AIS per se, are used when the adapter channel is enabled for CDB reprocessing and data is being sent to a device having indeterminate latencies in its data handling (e.g., through a device controller having a large buffer or a telecommunication device forwarding the data through an asynchronous communication link). The other options are used when CDB reprocessing is disabled.

The option to chain on either 0 count or AIS transition could be used in circumstances in which the AIS transition could precede detection of a 0 byte count (e.g., when data is being received from a device and passed to memory, or when data is being sent to a device through an unbuffered device controller which could initiate an AIS transition before the adapter could complete logical functions for decrementing its byte count to 0).

Figure 10:
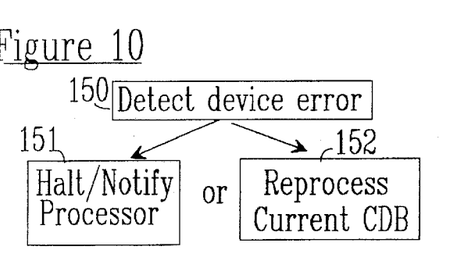
FIG. 10 is a diagram showing options available to the present adapter when it detects occurrence of a data transfer error at a device, in the configuration of FIG. 9, after detecting an internal byte count of 0 signifying that the adapter has successfully completed internal handling of the same data transfer.

FIG. 10 suggests how the CDB reprocessing capability could be utilized. Upon detecting error (item 150), the adapter can halt the channel, store status and notify the host processor via interrupt (item 151), or it can reprocess the current CDB without any indication to the host processor (item 152) if the channel is enabled for reprocessing and the channel is appropriately condition for chaining event detection.

6. Auto-I/O Applications

The auto-I/O operations described above can be used for many purposes. Auto-I/O Write operations can be used to transfer information to reconfigure (i.e., alter operating states of) devices (e.g., by sending control information to addressed ports, registers or other components of devices). Auto-I/O Reads can be used for relaying information other than status to the host processor (a single Read sequence) or for transferring information between two device components (a Read followed by a Write). Those skilled in the art will readily understand the utility and potential practical applications of these capabilities. A "non-limiting" example of an application for a Write-Write auto-I/O sequence is given next.

Figure 11:
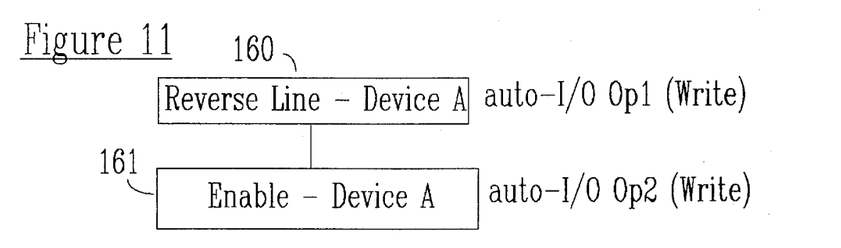
FIG. 11 is a flow diagram suggesting a typical application for a sequence of two auto-I/O operations defined by a single CDB.

Referring to FIG. 11, two auto-I/O Write operations to components (register, port, etc.) of one device (device A), are used to reverse data handling direction in the device (operation 160) and re-enable the same device for data handling. The practical application of this is described next.

Assume that device A is operating through a single channel of the adapter as a half-duplex communication element in a point-to-point data communication link over which data is being transferred in a particular protocol environment; e.g., with a "bisync protocol". In bisync, a single wire (or wire pair, in the case of signals transferred in a differential mode) acts as the data transfer medium. The bisync protocol dictates when a link terminal/node acts as a sender or receiver relative to the link. When an "end-of-frame" sequence is detected by a receiving terminal, the terminal may be reconfigured to switch to a sending mode. In conventional prior systems, this reconfiguring would involve engagement of the host processor with attendant delays (for the host processor to sense the adapter interrupt, recognize that it concerns end of frame detection, and then take signalling actions to reverse the directions of operation of the device and associated adapter channel. As described next,With the present invention, this can be accomplished without host involvement through a single adapter channel.

In the above environment, assume that device A is currently a data receiver, and that the adapter is processing a CDB defining the destination of the received data in memory. When the adapter detects the bisynch end of frame sequence in the received data it concludes the data transfer, and performs the auto-I/O sequence of FIG. 11 relative to device A which has been programmed into the currently processed CDB (i.e., it reconfigures the device as a bisync sender and enables it for immediate operation in that mode). The adapter then stores status in memory (indicating its completed actions) and chains to a next CDB defining a bisync transfer in the opposite direction through the same adapter channel and device. Notice that all of this occurs transparent to the host processor and with virtually no idling gap in productive processing in the adapter channel and device. Notice further that all of this occurs in a single adapter channel, whereas an equivalent full duplex transfer would require use of two adapter channels.

The foregoing example is non-limiting. It should be understood that the auto-I/O operations can be addressed to components of any device (i.e., components of a device currently attached to the adapter channel for data transfer, and components of any other device addressable by the adapter); and they can be used to transfer signals in any direction between the adapter registers 99 (FIG. 5B) and the addressed device component.

What is claimed is:

1. An adapter for interfacing between a memory subsystem of a computer system having a central processor and I/O devices served by said system, said adapter comprising:

first means responsive to first programmed information contained in descriptors prepared by said central processor for directing data transfers between said memory subsystem and said I/O devices, while said adapter and devices are operating in offline relationship to operations of said central processor of said computer system;

second means responsive to second programmed information contained in at least one of said descriptors, while said adapter and devices are still operating in offline relationship to said central processor, for conducting auto-I/O signalling operations between said adapter and any of said I/O devices; said auto-I/O signalling operations being used to transfer device controlling signals between registers in said adapter and specific internal components of said I/O devices; said specific internal components being designated by I/O address information contained in said second programmed information; said auto-I/O operations being characterized in that they can be used to alter operational states of said I/O devices in predetermined time coordination with data transfers conducted by said first means, and without interruption of or interference with ongoing operations of said central processor; and means enabling said adapter alternatively to reprocess a descriptor that is currently being processed and initiate chained processing of a next descriptor in a linked list queue; said reprocessing of said descriptor currently being processed being undertaken when processing of said descriptor currently being processed fails to reach successful completion; said chained processing of said next descriptor being undertaken when processing of said descriptor currently being processed is completed successfully;

means for detecting an asynchronous signal from a said I/O device involved in a data transfer that is being directed by said first means; said asynchronous signal indicating completion of data transfer handling by the device sending said signal; and means responsive to said detected asynchronous signal for initiating said chained processing of a said next descriptor in said linked list queue.

2. An adapter in accordance with claim 1 wherein:

a single said descriptor can be used to invoke data transfer and auto-I/O operations relative to different devices, and said second programmed information in each said descriptor defines a variable number of auto-I/O signalling operations to be performed by said adapter and an I/O device address to which each of said variable number of auto-I/O signalling operations is to be directed.

3. An adapter in accordance with claim 1 wherein:

any said descriptor can define performance by said adapter of 0, 1 or more than 1 auto-I/O operations, said auto-I/O operations being useful to transfer controlling signals between said adapter and said I/O devices, and wherein each descriptor defining at least 1 said auto-I/O operation contains an I/O device address associated with each respectively defined auto-I/O operation; each said associated I/O device address defining designating a location of a specific internal component of a specific I/O device relative to which said control signals of the respective auto-I/O operation should be transferred.

4. An adapter in accordance with claim 3 wherein each of said 1 or more than 1 auto-I/O operations defined by a said any descriptor can be specified to be an I/O Read operation, for causing said adapter to transfer information from a respective said I/O device address to a predetermined register in said adapter, or an I/O Write operation for causing said adapter to transfer information from a said predetermined adapter register to a said respective I/O device address.

5. An adapter in accordance with claim 4 wherein any said auto-I/O Write operation can be used to cause said adapter to transfer information to a component of a said I/O device with the effect of altering the operating state of the respective device.

6. An adapter in accordance with claim 5 wherein said auto-I/O Write operation can be used to alter the operating state of said respective device in coordination with other operations instantly being conducted by said adapter.

7. An adapter in accordance with claim 5 wherein a said descriptor defining performance of more than 1 said auto-I/O operations can be used to cause said adapter to read information from one device and write the same information to another device; all in timed coordination with performance of a data transfer defined by the same descriptor.

8. An adapter in accordance with claim 3 wherein:

said adapter contains two address registers reserved for holding predetermined ones of said 0, 1 or 2 respective I/O device addresses provided by said any descriptor, when said any descriptor is processed by said adapter, and two data registers dedicated for holding signals transferred in predetermined ones of said 0, 1 or 2 auto-I/O operations defined by said any descriptor.

9. An adapter in accordance with claim 1 wherein said adapter is connected to said memory subsystem of said computer system through a first bus that is not directly connected to said I/O devices, and wherein said adapter is connected to said I/O devices through a second bus that is isolated from said first bus.

10. An adapter for interfacing between a memory subsystem of a data processing system and I/O devices served by said system, said data processing system including a processor module furnishing programmed descriptors to said adapter, said descriptors defining functions to be performed by said adapter while said adapter and processor module are uncoupled, said adapter comprising:

means for communicating with said processor module for receiving descriptor pointers from said processor module; successive said descriptor pointers defining locations in said memory subsystem of descriptors to be successively processed by said adapter; each of said descriptors being stored by said processor module in said memory subsystem in an unlinked form in which the respective descriptor has no explicit linkage to any other descriptor stored by said processor module; each said stored descriptor being associated with a predetermined one of said I/O devices;

means for enqueueing the descriptors designated by said descriptor pointers into linked list queues associated with individual ones of said I/O devices, in the order of reception of respective said descriptor pointers; said means for enqueueing including means for writing said descriptor pointer information designating a newly enqueued descriptor into a descriptor previously entered into the same queue; whereby descriptors successively entered into each said linked list queue contain pointers to descriptors subsequently entered into the respective queue;

means for using said descriptor pointers in said enqueued descriptors to successively retrieve and process said descriptors in a chaining sequence, in the order of reception of said descriptor pointers; the processing of said descriptors including performance of a data transfer by said adapter between said memory subsystem and a predetermined one of said I/O devices;

means responsive to an asynchronous interface signal (AIS) originated by a said I/O device, during processing of a descriptor in the linked list queue associated to the same I/O device, for conditioning said means for using said descriptor pointers to initiate retrieval and processing of a next descriptor in said respectively associated linked list queue; and means enabling said adapter alternatively to reprocess a descriptor that is currently being processed and initiate chained processing of a next descriptor in a linked list queue; said reprocessing of said descriptor currently being processed being undertaken when processing of said descriptor currently being processed fails to reach successful completion; said chained processing of said next descriptor being undertaken when processing of said descriptor currently being processed is completed successfully.

11. An adapter in accordance with claim 10 comprising:

means for detecting an error condition during said performance of a said data transfer; and means responsive to said detected error condition for causing said means for using said descriptor pointers to retrieve and reprocess a descriptor that was being processed when said error was detected.

12. An adapter for interfacing between a memory subsystem of a data processing system and I/O devices served by said system, said data processing system including a processor unit furnishing controlling descriptors to said adaptor, individual said descriptors defining a plurality of operations to be executed by said adapter relative to one of said I/O devices associated with the respective adapter; said adapter having multiple I/O channels enabling said adapter to operate concurrently relative to multiple said I/O devices, said adapter comprising:

means for maintaining a separate linked list queue associated with each of said adapter channels; each said linked list queue containing descriptors successively dispatched by said processor unit to said adapter for defining operations to be performed successively by said adapter relative to the associated adapter channel and relative to a said I/O device currently served by said associated adapter channel; said successively dispatched descriptors entered into each said queue being received without specific linkage associations to other dispatched descriptors, and each said linked list queue being used relative to the associated adapter channel for scheduling chained processing of the descriptors successively entered into the respective queue; said plurality of operations defined by individual said descriptors in each said queue consisting of a data transfer operation, to be conducted by said adapter between said memory subsystem and a predetermined one of said I/O devices linked to the adapter channel associated with the respective queue, and 0, 1 or more than 1 auto-I/O signalling operations to be conducted by said adapter between 0, 1 or more than 1 predetermined registers in said associated adapter channel and I/O addresses specified in the respective descriptor; each said specified I/O address defining a specific internal component in one of said I/O devices which need not be the same I/O device as the said predetermined one of said I/O devices to which the data transfer operation defined by the same descriptor is directed;

means for receiving descriptor pointers directed to individual ones of said adapter channels; each pointer defining a location in said memory subsystem at which an associated said descriptor is stored; said associated descriptor being stored in an unlinked form;

means coupled to said descriptor pointer receiving means for enqueueing descriptors designated by said descriptor pointers into the linked list queues maintained for the channels to which the respective pointers are directed; whereby each descriptor in each channel's linked list queue contains a pointer to the descriptor next entered into the same queue; and means for using said descriptor pointers in the descriptors contained in each said channel queue to successively retrieve and process descriptors in the respective queue, in a chaining sequence, in the order of reception of said descriptor pointers; the processing of said descriptors involving performance of a data transfer by said adapter between said memory subsystem and a predetermined one of said I/O devices and performance of an auto-I/O process involving 0, 1 or more than 1 transfers of information between registers dedicated to the respective adapter channel and 0, 1 or more than 1 I/O addresses defined by the respective descriptor; whereby data transfer and auto-I/O signalling operations defined by one said descriptor can be directed to different ones of said I/O devices.

13. The method according to claim 12 wherein said variable number of auto-I/O signal transfers and said corresponding number of I/O addresses are definable in said second set of definition fields to be 0, 1 or 2 respective operations and addresses.

* * * * *